United States Patent [19]

Mortimer

[11] Patent Number: 4,642,951
[45] Date of Patent: Feb. 17, 1987

[54] SUSPENDED CEILING TILE SYSTEM

[75] Inventor: Francis J. Mortimer, Scarborough, Canada

[73] Assignee: Fam Tile Restoration Services, Ltd., Scarborough, Canada

[21] Appl. No.: 779,959

[22] Filed: Sep. 25, 1985

[30] Foreign Application Priority Data
Dec. 4, 1984 [Cax] Canada .................................. 469264

Related U.S. Application Data

[63] Continuation-in-part of Ser. No. 682,348, Dec. 17, 1984, abandoned.

[51] Int. Cl.⁴ ............................................... E04B 1/84
[52] U.S. Cl. .................... 52/145; 52/309.14; 52/515; 52/782; 181/290; 428/131; 428/518
[58] Field of Search .................... 52/144, 145, 309.14, 52/309.15, 311, 515–517, 484, 782; 181/290, 291; 156/84; 428/518, 136, 131; 29/480

[56] References Cited

U.S. PATENT DOCUMENTS 3,771,213  11/1973  Peraro ................................... 29/480
4,487,793  12/1984  Haines ................................. 428/136

Primary Examiner—J. Karl Bell
Attorney, Agent, or Firm—Shoemaker and Mattare, Ltd.

[57] ABSTRACT

A method for refurbishing a suspended acoustical tile ceiling when the tiles become soiled comprises inserting a tile insert beneath each soiled tile to provide a new face to the suspended ceiling. The tile insert comprises a thin layer of substantially rigid material with an acoustical pattern of holes extending therethrough. The tile insert has a front face which is of washable material. In this manner, an entire suspended ceiling system can be refurbished without the need to remove the existing tiles. The tile insert may include a moisture barrier on the rear face of the tile insert. The moisture barrier improves washability of the tile and significantly enhances the noise reduction properties of the refurbished suspended ceiling.

45 Claims, 17 Drawing Figures

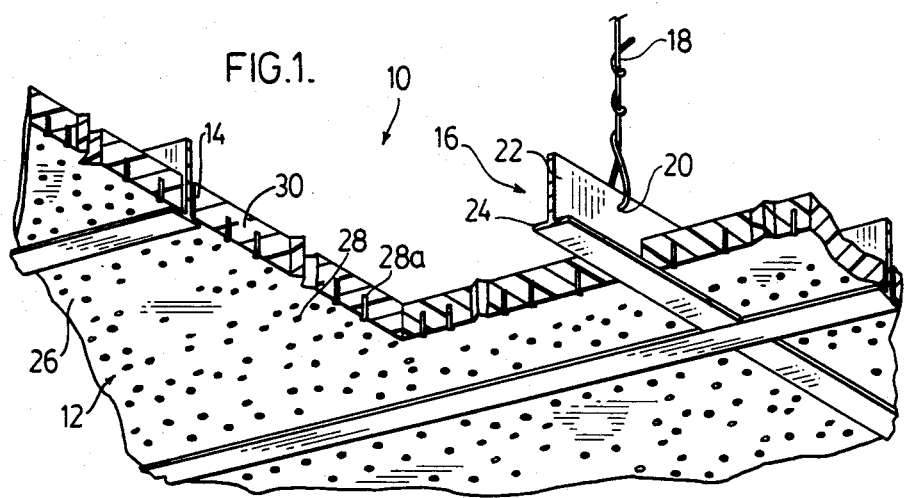
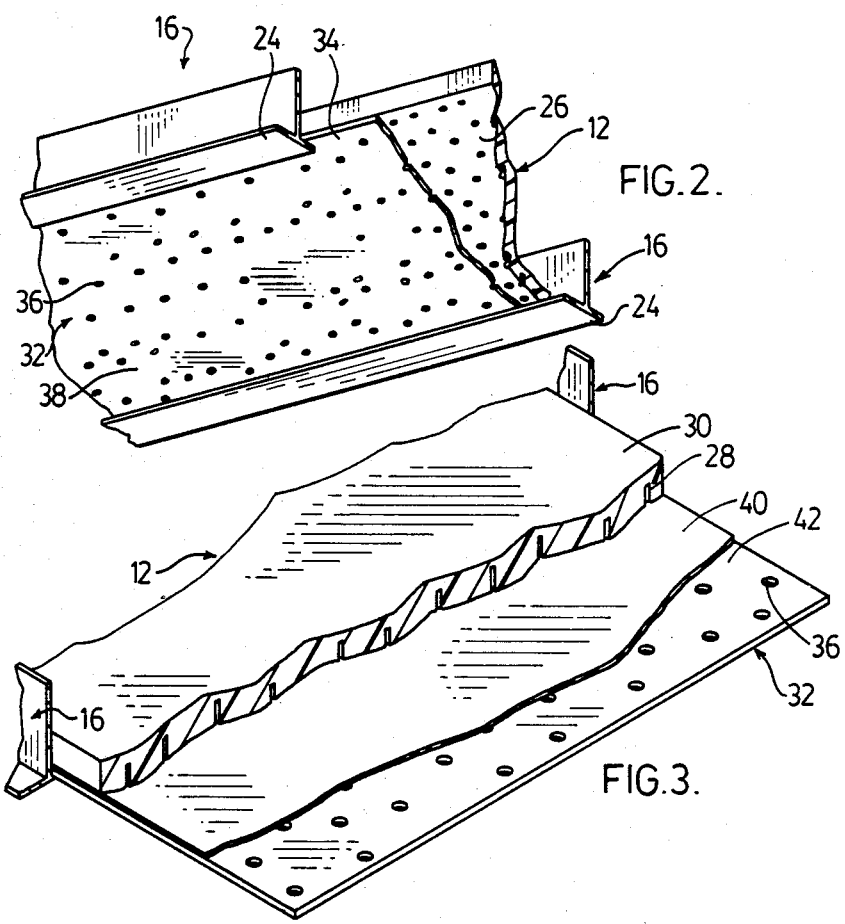

SUSPENDED CEILING TILE SYSTEM

This application is a continuation-in-part of U.S. Pat. application Ser. No. 682,348 filed Dec. 17, 1984 now abandoned.

FIELD OF THE INVENTION

This invention relates to acoustical tile suspended ceilings and method and product for refurbishing suspended acoustical tile ceilings.

BACKGROUND OF THE INVENTION

Suspended tile ceilings have been used extensively in industrial, office and home building construction. Suspended ceilings are particularly useful in areas where it is not desirable to close off the space between the ceiling level and the floor above. This provides access to wiring, heating, plumbing and other service installations. Over an extended period of time, acoustical ceiling tile normally become soiled, particularly in industrial areas, commercial cooking establishments and offices. In addition, air conditioning outlets, particularly those extending through the suspended ceiling, distribute a considerable amount of soot over the panel surfaces.

It is very difficult to clean acoustical tiles. Normally acoustical tiles have holes extending through the face and into the acoustical layer behind the face. Should one attempt to wash the acoustical tile, the wash water passes up through the holes into the water absorptive acoustical backing and leaches dirt back to the face of the tile. This can result in spotting of the tiles after they have been washed. People have attempted to paint the tile face instead of washing. However, this normally plugs the holes of the acoustical tile reducing its acoustical properties. Attempts have also been made to bleach the suspended ceiling tile to bring it back to its natural white color. However the bleach, if not properly applied, can be corrosive to the suspending T-bar members and can discolor the suspended ceiling tile. A system has been developed which successfully paints the ceiling tile without clogging the acoustical holes. The paint is a highly loaded titanium dioxide base. However, in spraying this paint onto the tile, it is necessary to cover all of the suspended T-bars with tape to prevent overcoating the metal. This becomes a very time consuming and labour intensive job.

Attempts have been made in providing vinyl coated acoustical tile. However because of the holes provided through the vinyl, wash water can leach dirt from the acoustical padding of the tile back through the porous vinyl coating onto the surface and thereby discoloring the washed panel face. An example of this type of tile is disclosed in U.S. Pat. No. 4,040,213 which consists of an acoustical prefabricated panel having a thin flexible laminated facing adhesively secured to the fiberglass acoustical panel. To provide for sound absorption, holes are provided through the thin flexible laminated facing to expose the sound absorption fiberglass panels. The thin flexible laminated facing is made up of laminate layers of thin, impact resistant, metallic film laminated to glass fiber scrim which is, in turn, laminated to a synthetic film. If no holes were provided in the face of this panel, the panel would be washable. However, its acoustical properties would be very poor, thereby necessitating the acoustical pattern of holes and in turn precluding washing. A further example of this type of acoustical suspended ceiling tile is disclosed in U.S. Pat. No. 4,487,793. The acoustical tile includes a base structure of fibrous material with another face of vinyl material. A plurality of apertures are provided in the outer vinyl layer. Such relationship provides for satisfactory acoustical noise reduction properties, however, when any attempts are made to wash the panel, the wash water passes through the apertures in the outer vinyl coating and leaching dirt back down to the face of the panel. Such leaching action may occur over a number of hours or days making it impossible to properly clean the face of the acoustical panel.

Examples of suspended ceiling tiles, which have washable metal faces, are disclosed in U.S. Pat. Nos. 1,972,563 and 3,695,395. The difficulty with each of these panel arrangements is that wash water can pass through the apertures in the metal panel mixing with dirt on the inside of the metal panel and, eventually by capillary attraction, reappearing on the face of the panel after it is wiped down to resoil the panel face.

Plastic panels, which provide washability of the face of the panels, are disclosed in U.S. Pat. No. 2,966,954. The panel is a composite of two or more plastics which include apertures offset from one another to define a tortuous path and thereby provide sound deadening properties. The difficulty with this system is that wash water used in cleaning the face of the panel can flow to within the several spaces between the panel portions and eventually run back resulting in resoiling of the panel face even after the washed panels have been wiped down.

Suspended ceiling panels, which include a continuous washable surface, are disclosed in U.S. Pat. Nos. 4,241,806 and 4,248,647. In U.S. Pat. No. 4,241,806, a panel construction consists of an outer decorative layer of plastic which is very light and thin. Underlying the decorative plastic layer is a perforated steel plate which is also relatively thin. The perforated steel plate transmits sound waves which pass through the outer decorative film into an acoustic absorption layer. Due to the outer layer being continuous, it is possible to wash down the panel without causing any soil behind the perforated metal plate leaching out onto the outer surface of the panel.

U.S. Pat. No. 4,248,647 discloses an acoustical suspended ceiling tile which has a washable, distortion-free, decorative plastic film on the front face of the panel, such decorative film may be of Mylar polyester films (trade mark). The tile has a frame which defines a recessed area providing an acoustical base portion. The plastic film is adhered to the frame and heat-shrunk to provide a taut distortion-free film across the face of the panel. Such panels are not practical for most types of suspended ceilings because the film can be readily punctured, due to it being spaced from the recessed acoustical base, thereby ruining the appearance of the panel.

Other types of suspended ceiling tiles which include an outer plastic film or metal foil to provide for washability of the tiles are disclosed in U.S. Pat. Nos. 3,204,380 and 3,771,213. Plastic film as disclosed in U.S. Pat. No. 3,204,380 is applied to the face of each interlocking acoustical tile. The film is drawn tightly to the face of the tile by the use of vacuum or the like, and with heating the softened film edges are secured by adhesive to the tile edges. The plastic sheet overlying the tile face acts as a vibrating member to transmit the sound waves to the underlying base which absorbs the sound energy sufficiently to appreciably reduce noise. The plastic film face is washfast and water impervious, to provide tiles which can be cleaned or washed without damage to the ceiling or other surface to which the tiles are applied, and without impairment of their acoustical properties. In U.S. Pat. No. 3,771,213 a metal foil is applied to the face of the tile. To ensure that the metal foil tightly fits the face of the tile and preventing sagging in the centre portion of the tile face, mechanical embossing of the foil is used to draw the foil tightly between the edges of the tile. Sound waves will strike against the foil and cause the foil to vibrate, whereby the sound is transmitted to the punched fibre-board backing where the sound vibrations are absorbed within the holes of the fibre-board backing of the suspending ceiling tile. However, both of these tile systems are not useful in a practical sense because the plastic film or metal foil can be readily punctured due to normal wear and tear in an office, industrial or home environment, hence rendering it impossible to clean the tile face. Furthermore, with the stretching or tightly fitting of the plastic film or metal foil to the face of the acoustic panel, the face can reflect by vibration more sound than it transmits through to the fibrous sound-absorbing backing material, hence requiring the use of holes or the like in the outer facing, thereby suffering from the drawbacks of the aforementioned U.S. Pat. No. 4,040,213.

In view of these difficulties with the existing expensive constructions which do offer washability of the panel for purposes of refurbishing, in most installations the acoustical ceiling tiles are simply replaced with new tiles, rather than any attempt made to refurbish the existing tiles with more expensive washable type.

According to this invention, a system is provided for refurbishing an existing suspended ceiling tile without the need to replace the existing tile and, in turn, provide a system which is washable and can enhance the acoustical properties of the tile ceiling.

SUMMARY OF THE INVENTION

According to an aspect of the invention, a method for refurbishing a suspended acoustical tile ceiling comprises inserting a tile insert beneath each soiled tile. The soiled tiles are suspended by a plurality of suspended tile supporting members arranged in a grid formation. The supporting members support each tile by engaging a perimeter portion of the tile. The standard size tile insert may be cut to a size to correspond with the size of the soiled tile, whereby the supporting members support the tile insert beneath and thereby covering the soiled tile. The tile insert comprises a thin layer of substantially rigid material with a plurality of holes extending therethrough in the form of an acoustical pattern of holes. The tile insert has a front face which is of washable material. According to a preferred aspect of the invention, a moisture barrier layer is affixed to a rear face of the tile insert whereby the barrier layer covers the holes and isolates the insert tile rear face from the soiled acoustical tile. The moisture barrier may be affixed to the rear face of the insert in a manner which considerably enhances the acoustical sound absorption properties of the ceiling.

According to another aspect of the invention, a composite suspended tile ceiling is provided which comprises in combination a tile insert beneath an acoustical panel. The suspended tile ceiling comprises a plurality of suspended tile supporting members arranged in a grid formation. The tile insert comprises a thin layer of substantially rigid material with a plurality of holes extending therethrough in the form of an acoustical pattern of holes. The tile insert has a front face which is of washable material. The tile insert is supported about its perimeter edges by the grid of supporting members with an acoustical panel lying and unattached to the tile insert.

According to another aspect of the invention, a tile insert for use in refurbishing soiled acoustical tiles of a suspended tile ceiling comprises a thin layer of substantially rigid material with a plurality of holes extending therethrough in the form of an acoustical pattern of holes. The tile insert has a front face which is of washable material. The tile insert is sized to fit beneath the soiled tile of a suspended tile ceiling and is supported by supporting members of a suspended tile ceiling.

According to another aspect of the invention, a method for manufacturing the tile insert for use in refurbishing a suspended tile ceiling comprises forming a thin layer of substantially rigid material. A plurality of holes are formed through the tile insert layer which are positioned to form an acoustical pattern in the tile insert. The front face of the tile insert is provided with a washable surface. To the rear face of the tile is affixed a moisture barrier film for covering at least the acoustical pattern of holes. The method may further comprise extruding the thin layer of substantially rigid material from an extrudable plastic material. The extruded layer is allowed to cool and the acoustical pattern of holes is punched from the extruded layer. The moisture barrier film is affixed to the rear face of the punched extruded layer and cut to form the tile insert. The method may also comprise thermoforming the tile insert from a sheet of substantially rigid plastic material. A plurality of criss-crossing strengthening ribs may be thermoformed into the layer of rigid plastic material.

BRIEF DESCRIPTION OF THE DRAWINGS

Preferred embodiments of the invention are shown in the drawings wherein:

FIG. 1 is a perspective view of the standard type of suspended acoustical tile ceiling;

FIG. 2 is a perspective view of a section of the suspended tile ceiling of FIG. 1 showing the tile insert in place for refurbishing the tile ceiling;

FIG. 3 is a perspective view from above the suspended ceiling showing the relationship of the existing acoustical tile to the tile insert;

DETAILED DESCRIPTION OF THE PREFERRED EMBODIMENTS

Figure 4:
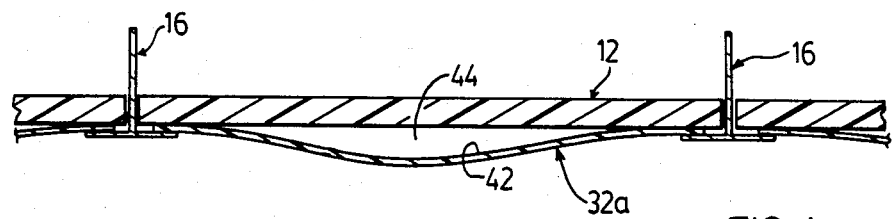
FIG. 4 is a section through the suspended acoustical tile ceiling with the tile insert in place.

Suspended ceilings can be provided in many forms, such as exemplified in FIG. 1. The suspended ceiling 10 comprises a plurality of individual ceiling panels or tile 12 supported about their peripheral edges 14 by a gridwork of intersecting T-bars 16. The T-bars are suspended from the ceiling by wires 18 which are fastened to the existing ceiling (not shown) and then hooked through an appropriate aperture 20 in the upright leg portion 22 of the T-bar. The panel peripheries 14 rest on the flange portions 24. Normally, the ceiling tiles 12 are self-supporting and may be of standard sizes of two feet by four feet, or two feet by two feet square. The particular ceiling tile shown in FIG. 1 is of the acoustical type having a planar sound absorptive surface 26 with an acoustical pattern of holes 28 formed therein which extend into the acoustical absorptive material 26 to the extent shown at 28a.

The ceiling tile 12 may be formed of a variety of materials. Commonly, the outer face is provided with a decorative coating which is usually white and may be of a variety of forms of coatings which can include fire retardants and smoke suppressants. The sound absorptive layer 30, into which the acoustic holes are formed, may consist of compressed fiberglass or other compressed fibres such as a wood fibres and composite mineral board, where the intention is that the material 30 provides sound absorptive characteristics and adds self-supporting characteristics to the ceiling tile 12.

The outer face 26 of the ceiling tile can become soiled over time due to installation in industrial areas, commercial cooking establishments and offices. Dirt, soot, and smoke in the area and handling of tiles can soil the ceiling tile from the underside. Flooding from above the tile can cause staining on the tile face 26.

The ceiling tile insert, according to this invention, is placed beneath the ceiling tile 12 to immediately refurbish the suspended tile ceiling 10 without the need for painting or other techniques, such as washing, in attempting to refurbish the tile 12. Dirt and soot can collect in the holes 28 of the acoustical type of tile. Any attempt to wash the face 26 of the tile 12 results in water passing into the holes and then leaching dirt down from the holes which will simply necessitate rewashing of the tile panel after it was initially cleaned.

By use of the ceiling tile insert 32, as shown in FIG. 2, the outer face 26 of the existing suspended ceiling tile 12 is immediately refurbished. The ceiling tile insert 32 is sized to correspond with the size of the existing tile 12. For example with the suspended ceiling 10 of FIG. 1, the tiles 12 are two feet by four feet. The ceiling tile insert 32 is of corresponding size. To refurbish the ceiling 10, the ceiling tile inserts 32 are placed beneath the existing tiles 12 to rest on the flange portions 24 of the respective suspended T-bars 16. To place the ceiling tile insert 32, existing tile 12 is simply elevated sufficiently to allow placement of the insert 32 within the space defined by the gridwork of the suspended T-bar 16 and releasing the insert to allow the pre-existing panel 12 to fall back down on top of the insert 32 which is now supported about its periphery 34 by the suspended T-bars 16.

The ceiling tile insert 32 is provided with an acoustical pattern of holes 36. As shown in FIG. 3, these acoustical holes 36 extend through the thickness of the tile insert 32. The pattern of these acoustical holes may be random, as shown in FIG. 2, and thus will not necessarily align with the acoustical holes 28 in the sound absorptive material 30 of the pre-existing panel 12. The ceiling insert tile 32 is provided with an outer face 38 which is of washable material. This permits washing of the refurbished ceiling when the tile inserts 32 become soiled. Due to the tile insert being independent of the acoustical tile, the insert can be readily withdrawn from the ceiling for washing and then returned to the ceiling. This avoids dirt in the acoustical holes causing a problem. Another washing technique is to use a fine spray of wash water on the inserts while they remain in the ceiling. The wash mist can be wiped off.

A moisture barrier 40 may be used to provide for easy washing of the tile insert 32 and prevent the wash water due to a capillary attraction drawing dirt from the existing tile 12 on to the face 38 of the tile insert. The moisture barrier is affixed to the rear face 42 of the tile insert. The moisture barrier 40 prevents any moisture applied to the face 38 of the tile insert from leaching dirt out of the soiled tile onto the face of the tile insert 32. The moisture barrier 40 precludes any moisture which may fall onto the panels 12 from draining through the tile insert and further soiling the tile insert face. The moisture barrier 40 also precludes dirt from within the room permeating through the acoustical tile insert and into the pre-existing tile 12. Normally, the insert 32 is sufficiently thin that washing of its exterior face 38 clears out any dirt which may collect within the acoustical apertures 36.

Figure 6:
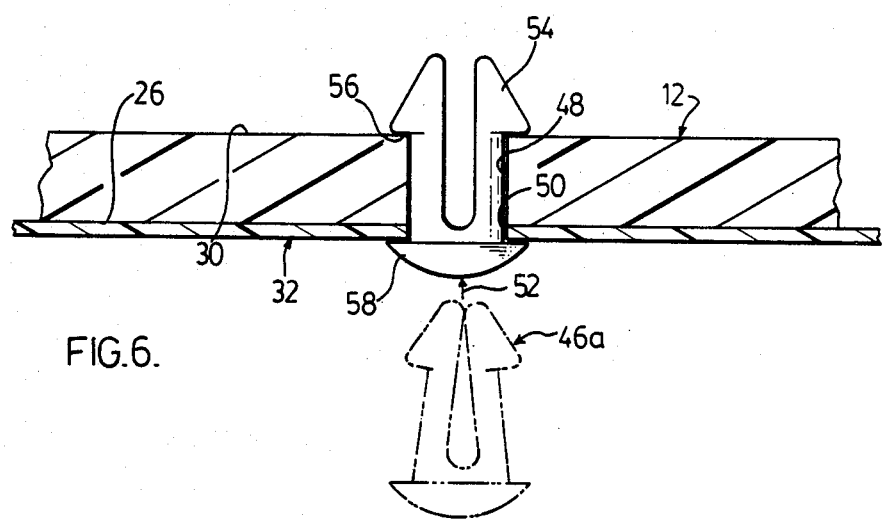
FIG. 6 is the section of FIG. 5 with the fastener in place.

As shown in FIG. 4, if particularly thin non-self-supporting material is used for the tile insert 32, it will tend to droop or sag as shown at 32a resulting in a bulge in the face of the tile insert and a space 44 between the rear face 42 of the tile insert and the acoustical panel 12. Although the tile insert has to be of substantially rigid material, i.e. a plastic panel which will flex along its length and width to allow insertion in the ceiling, it has to have sufficient rigidity to permit placement within the ceiling. Thus the insert cannot be of a thin flexible material such as polyethylene film since it would be very difficult to place that type of insert. If the tile insert 32 is essentially self-supporting, a slight bulge in the face of the tile insert is acceptable. However, the extent of bulging as shown in FIG. 4 may in some situations be unsatisfactory from an aesthetics point of view. To overcome this problem, fasteners may be used to affix the tile insert 32 to the acoustical panel 12. As shown in FIG. 6, a bifurcated fastener 46 may be pushed through the aperture 48 provided in panel 12 and aperture 50 provided in tile insert 32. The bifurcated fastener, as shown in FIG. 6, can be reduced in width dimension as shown at 46a and inserted in the direction of the arrow 52, so as to extend through the aperture 48 in the panel 12. The lug portions 54 spread outwardly once their undercut portions 56 clear the upper surface 30 of the acoustical panel 12. The head portion 58 then draws the tile insert 32 against the underside 26 of the self-supporting acoustical panel 12. Thus unsightly bulges in the tile insert can be eliminated, where normally for a panel such as two feet by four feet, only one or two fasteners need be used. The head portion 58 of the fastener 46 may be formed of transparent material or of a material which is colored to match the color of the exterior face 38 of the tile insert. When it is desired to leave a small spacing between the insert and the acoustical panel to enhance its acoustical properties in a manner to be discussed, spacer washers may be used about the perimeter of the insert and at the locations for the fasteners.

An alternative arrangement for connecting the tile insert 32 to the supportive acoustical panel when the insert is not self-support, is to use an adhesive. Various forms of adhesives may be employed, such as hot melts which have a set-up time of approximately one half a minute to allow proper placement of the insert into position before firmly adhering to the acoustical panel 12. Pressure sensitive adhesives may be used which permit movement of the panel before setting up and adhering to the acoustical tile 12. Any other form of adhesive would be acceptable which can be used in association with the tile insert rear face, which will not affect the moisture barrier and affix the interior surface of the panel insert to the acoustical tile. Examples of other types of adhesives include contact adhesives, rubber based adhesives, polyvinyl acetate adhesives, tapes which have double sided adhesive and adhesives with transfer films where removal of the film exposes the adhesive for adhering to the acoustical panel 12.

Aside from the use of fasteners and adhesives for affixing the tile insert to the acoustical panel, it is appreciated that one or more metal or plastic struts spanning the T-bars may be placed intermediate the tile insert to support it adjacent the acoustical panel. Another alternative is to provide an elastic member secured between opposing T-bars of the suspended grid network which can be used to support the tile insert intermediate its ends and sides.

Figure 7:
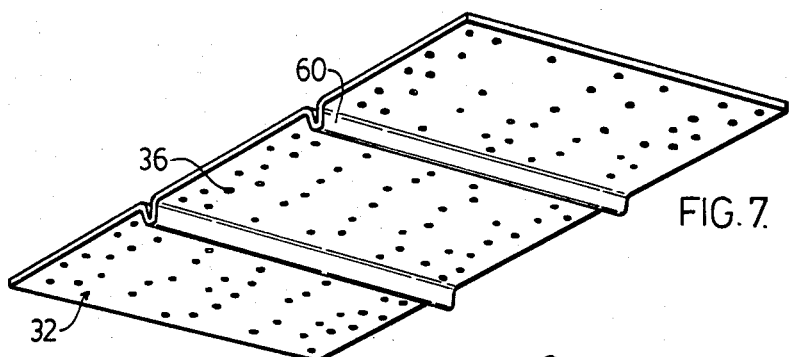
FIG. 7 is a perspective view from the underside of the self-supporting type of tile insert.
Figure 8:
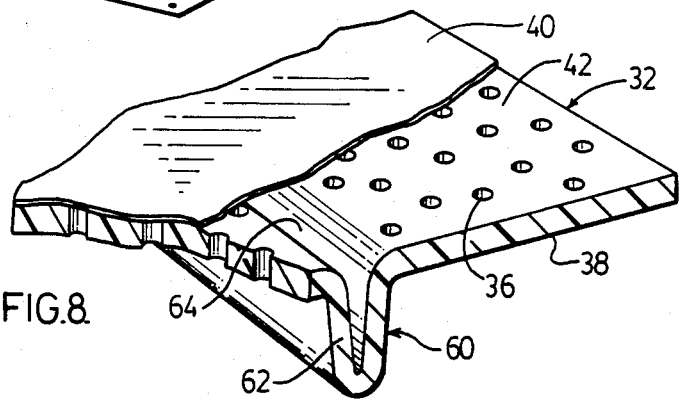
FIG. 8 is a perspective view from above the tile insert.

It is appreciated that thicker tile inserts may be used which in themselves would be self-supporting, particularly of the two foot by two foot size, or the ceiling tile insert when formed may include strengthening ribs which provide a self-supporting ceiling tile insert. As shown in FIG. 7, the ceiling tile insert 32 may include a plurality of strengthening ribs 60 which are formed in the tile insert 32 during the manufacturing process. As shown in more detail in the section of FIG. 8, each of the strengthening ribs 60 is defined by a ridge 62 extending from the underside 38 of the tile insert 32. In forming the ridge 62, a trough 64 is formed on the upper side 42 of the tile insert. The accustical apertures 36 may be either formed into the tile insert before or after the formation of the strengthening ribs 60. The moisture barrier 40 is affixed to the rear face 42 of the tile insert after the formation of the strengthening ribs 60. As shown in FIG. 7, the strengthening ribs 60 traverse the width of the tile insert to avoid the sag or droop in the insert as shown in FIG. 4. By a judicious choice of rib designs, a pattern can be added to the face of the tile to strengthen the tile, render it self-supporting and also add a decorative appearance to the tile insert exterior.

Figure 12:
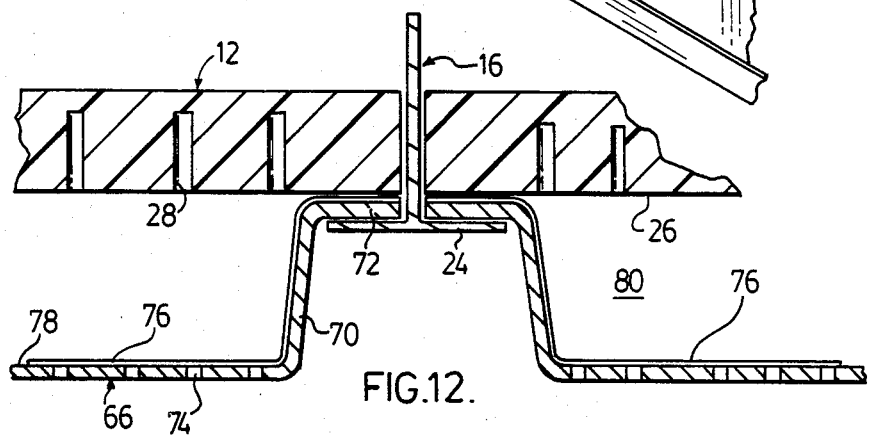
FIG. 12 is a section along the line 12—12 of FIG. 11.

To enhance the decorative effect of the suspended tile ceiling, a dish-shaped tile insert 66 may be inserted beneath an existing tile 12 as supported by the T-bars 16. The tile insert 66 has a front face 68 with inwardly extending side walls 70 and laterally projecting flange edge portions 72 which are supported by the suspended T-bar gridwork 16. As shown in FIG. 12, the ceiling tile insert 66 has a pattern of acoustical apertures 74 extending through the tile insert 66. A moisture barrier 76 is affixed to the rear surface 78 of the panel insert and, in this embodiment, overlaps the side wall portions 70 and the lateral flange 72. The weight of the panels 12 hold the flange portion 72 against the T-bar flanges 24. By this arrangement, a space 80 is provided between the bottom face 26 of the acoustical panel 12 and the moisture barrier 76. This space 80 enhances the acoustical absorption properties of the tile insert 66 as demonstrated in the following example, as well as providing a decorative refurbishing aspect to an existing suspended ceiling tile system.

The tile insert may be formed of a variety of materials which have an exterior washable face and provide for the fixing of the moisture vapor to the tile insert rear face. Rigid and semi-rigid plastics, which have sufficient flex to allow placement of the tile insert within the suspended ceiling T-bar grid work, are acceptable. Materials other than plastics, such as aluminum and other rust-resistant metals, and pressboard may also be used. Representative plastics include acrylonitril-butadiene-styrene polymers, acrylic polymers, phenolic polymers, Nylon (trademark), polycarbonates, polyesters, high and low density polyethylene and copolymers thereof, polyimides, polypropylene, polystyrene and polyvinylchloride. The moisture barrier may be any suitable film which acts as a barrier to moisture passing beyond the tile insert and impregnating the existing acoustical panel or like suspended ceiling tile. Suitable materials for the moisture barrier, therefore, include plastic film, thin rubber, rubber foam, plastic foam, waterproof flame retardant paper, aluminum foil. A variety of plastics are acceptable for the plastic film, including polyethylene, polyvinylchloride and polystyrene.

Figure 5:
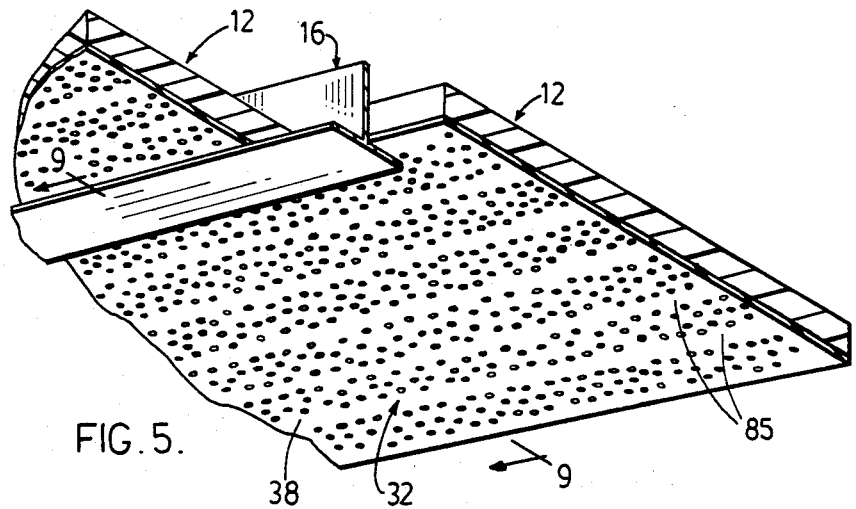
FIG. 5 is a perspective view showing the use of a fastener to reduce sag with a non-self-supporting tile insert.
Figure 9:
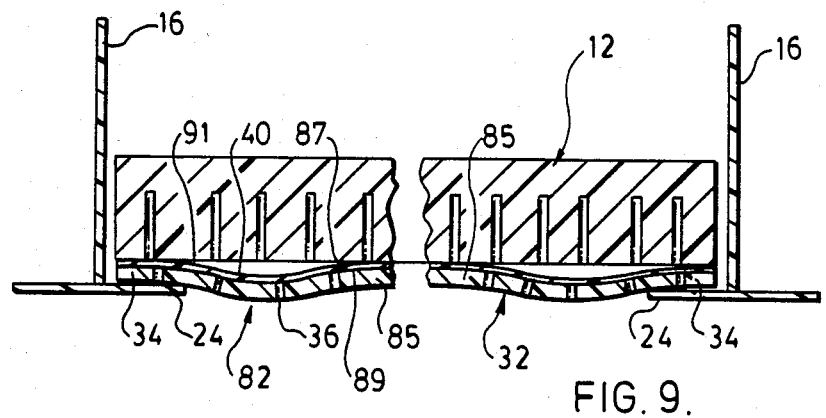
FIG. 9 is a section along the lines 9—9 of FIG. 5.

The composite pre-existing acoustical tile and tile insert generally designated 82 as shown in FIG. 9 has the acoustical panel 12 resting on top of the tile insert peripheral edges 34 supported by the flanges 24 of the respective suspended ceiling T-bars 16. The patterned array of acoustical apertures 36 in the ceiling tile insert 32 provide for rows of sets of apertures in the manner shown in FIG. 6. According to a preferred embodiment of this invention, the portions of the ceiling tile insert between the rows of apertures designated 84 may be affixed to the pre-existing acoustical panel 12. The insert may be affixed by means of fasteners such as shown in FIG. 5, or according to this preferred embodiment, at least some of the blank portions 85 of the insert with the moisture barrier on the rear are affixed to the acoustical panel 12 by an adhesive 87. In this arrangement, the moisture barrier 40 is affixed to the rear face of the insert 32 by use of adhesive 89. The moisture barrier is affixed to the rear face of the insert in a manner to provide for an unstretched, loose fitting of the moisture barrier over the sets of apertures. Then, by affixing the moisture barrier to the acoustical panels with a hot melt adhesive or the like, a predetermined amount of sag occurs in the tile insert to the extent shown in FIG. 9 between the spaced-apart locations of the adhesive which affix the insert to the acoustical panel 12. In this manner, a slight gap 91 of approximately ¼ inch is provided between the tile insert below the underside of the acoustical panel 12.

Figure 10:
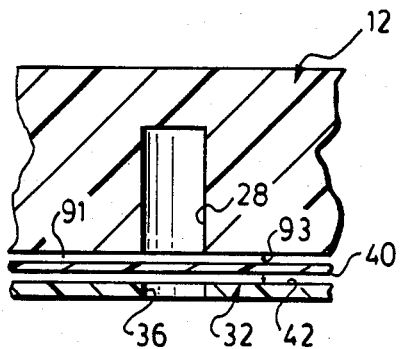
FIG. 10 is an enlarged view of a portion of the section of FIG. 9.

With reference to FIG. 10, the gap 91 is demonstrated where the moisture barrier 40 is also free from the underside 42 of the ceiling tile insert 32. Sound waves directed towards the ceiling tile insert 32 pass through the acoustical apertures 36 and induce vibration in the unstretched, loose moisture barrier 40 in the direction of arrows 93. The loose fitting moisture barrier then acts to dampen the energy of the sound waves passing through the acoustical apertures 36, and in turn transmitting the sound waves into the acoustical panel 12 which serves to further dampen and absorb the energy of the sound waves. However, due to the loose, unstretched nature of the moisture barrier 40 and the provision of a small gap 91 between the insert and the acoustical tile, it has been found that there is a considerable marked increase in the sound absorptive or sound deadening capacity of the composite acoustical tile and tile insert compared to normal acoustical panels. It is believed that the loose fitting of the moisture barrier 40, which may for example be a thin film of polyethylene of a thickness in the range of one-half to 3 mil, absorbs a considerable portion of the energy of the sound waves as they are transmitted through the moisture barrier into the acoustical panel 12, unlike systems which have moisture barriers which are taut, and transmit the sound wave energy to the acoustical panel and at the same time reflect or retransmit the sound waves. It is appreciated, however, that film thicknesses in the range of one-half to 10 mils are useful.

Figure 14:
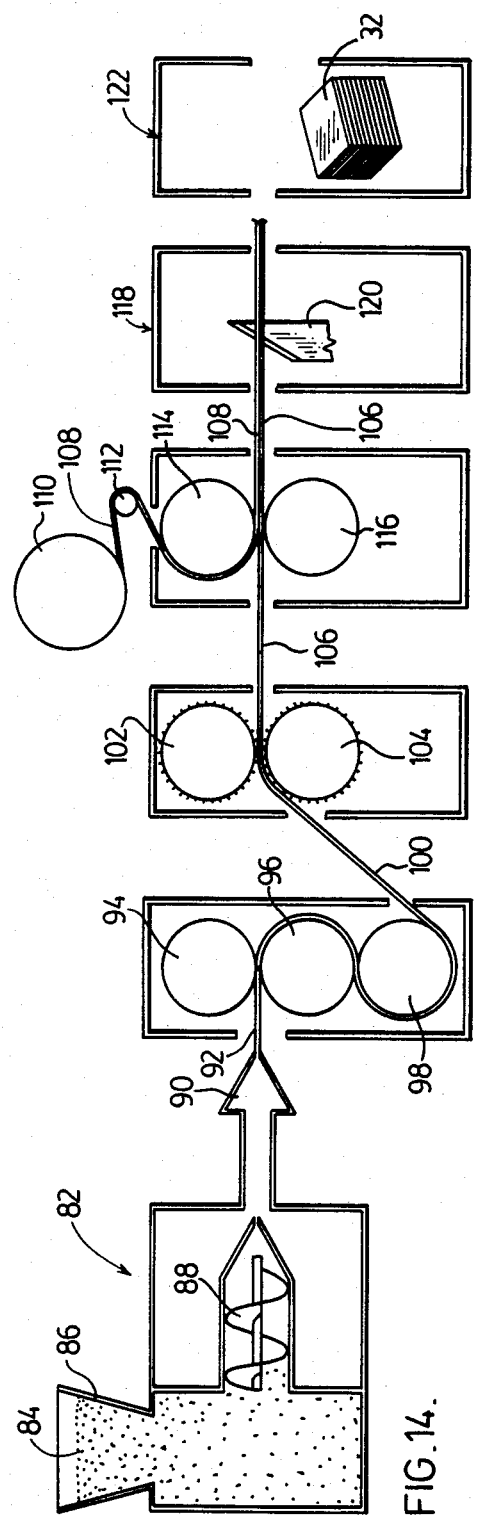
FIG. 14 is a schematic of an extrusion process for manufacturing the ceiling tile insert.

A variety of techniques may be used in manufacturing the ceiling tile insert. When quantities warrant, the ceiling tile insert can be injection molded, particularly if complicated shapes are desired. However, thermoforming techniques and extrusion techniques are equally useful on mass production economic basis. Referring to FIG. 14, an extruder 82 is used to extrude the plastic in forming the sheet material or metal alloy sheet may be formed by rolling. For example, the plastic resin pellets 84 are introduced via the hopper 86 and extruded by screw 88 through extrusion die 90 to produce a sheet 92 of a width equal to the length of the ceiling tile insert to be formed. The sheet 92 is passed over rollers 94, 96 and 98 to cool and form the sheet into a uniform thickness sheet material 100. The acoustical pattern of holes may be punched into the cooled sheet 100 by mating punch dies 102 and 104 or a punch press to produce a continuous sheet 106 having the acoustical pattern of apertures repetitively formed therein. The moisture barrier 108 is withdrawn from a supply roll 110 and passed over idler roller 112 and fed between compression rollers 114 and 116 to affix the moisture barrier to the surface of the sheet 106. The moisture barrier 108, if of a plastic material, may be heat sealed to a heat sealable plastic material for the sheet 106. On the other hand if heat sealing cannot be employed, adhesive may be used. A variety of different types of adhesives may be used which are sprayed or applied by an applicator device on idler roller 112. With adhesive techniques, the moisture barrier may be affixed to a majority of the surface area of the sheet, thus enclosing or being affixed to the periphery of the majority of apertures in the sheet 106. If heat sealing techniques are used, the moisture barrier film is affixed to the periphery of essentially all of the holes in the insert.

It is appreciated, however, that when it is desired to make the ceiling tile insert of FIG. 9, where the moisture barrier is affixed to selective portions of the insert, glue applicator wheels or the like may be used to apply adhesive to the planar regions 85 of the ceiling tile insert. The moisture barrier is then laid onto the ceiling tile insert inside surface 42 and by pressure roller affixes the moisture barrier to these portions of the ceiling tile insert between the rows of sets of acoustical apertures. The moisture barrier is then left free, and in an unstretched manner loosely overlies the apertures of the ceiling tile insert. Similarly, heat sealing of a plastic moisture barrier to a plastic tile insert at areas 85 may be used in place of hot melt adhesives.

A cutting device 118 cuts the continuous sheet 106 with the moisture barrier 108 laminated thereto by way of a travelling knife 120. The movement of the travelling knife 120 is timed to cut the sheet into separate ceiling tile inserts with moisture barrier affixed thereto and stacked in the packaging station 122. The tile inserts are cut from the sheet so that the repetitive acoustical pattern is preferably symmetrical on each severed tile insert. In the extrusion process, the strengthening ribs, such as shown in FIG. 7, may be extruded in the sheet since the strengthening ribs extend across the width of the ceiling tile insert 32 which is the direction of travel of the extruded sheet 100. The strengthening ribs may be formed at the extrusion die 90 or by appropriate mating ridges and grooves in the rollers 94, 96 to work the extruded sheet before cooling over roller 98.

Figure 11:
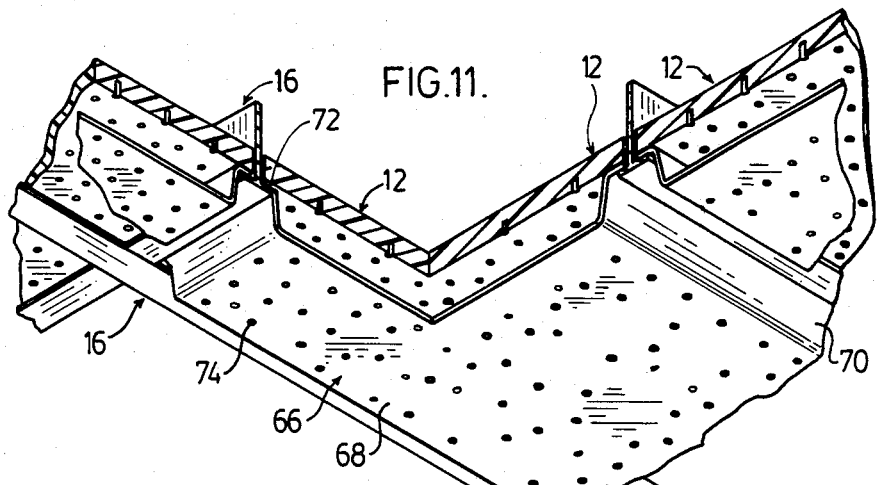
FIG. 11 is a perspective view in section of an alternative embodiment for the tile insert.
Figure 13:
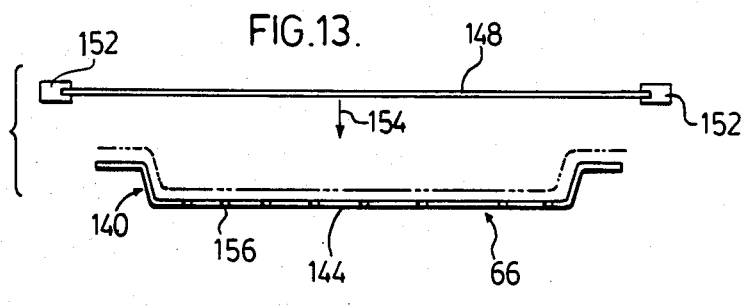
FIG. 13 schematically illustrates the gluing of a moisture barrier to the rear face of the tile insert.
Figure 15:
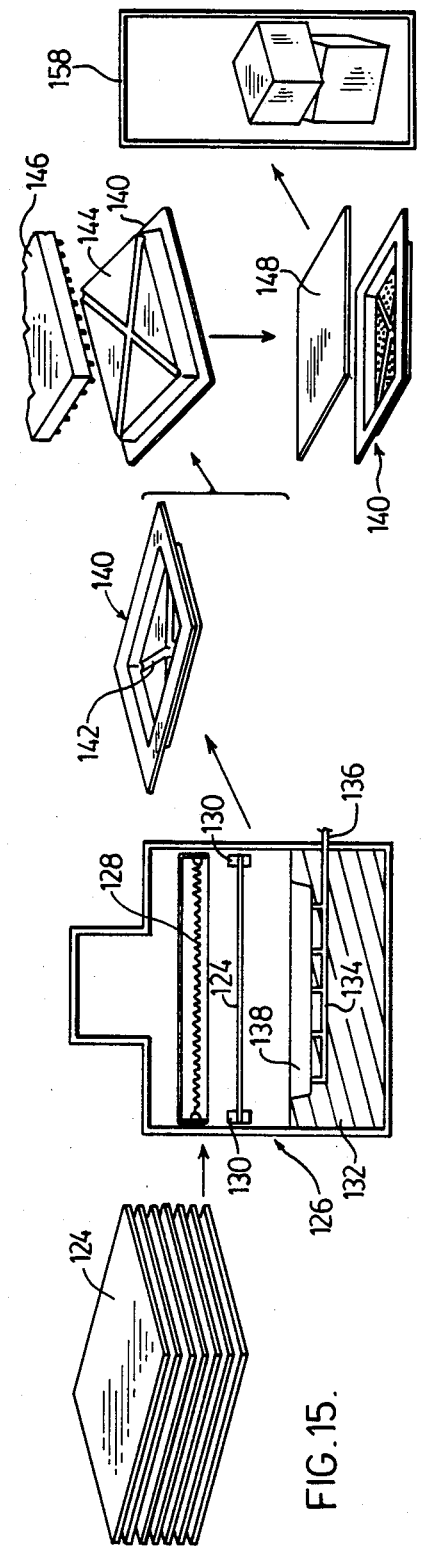
FIG. 15 is a schematic showing the thermoforming of the ceiling tile inserts.

An alternative approach to forming the ceiling tile insert is schematically shown in FIG. 15. Individual sheets 124 are removed from a pile and transferred to a thermoforming oven 126. The sheet 124 is heated by heating element 128. The sheet 124 is held by clamps 130 and lowered onto the thermoforming device 132 having a manifold 134 with an outlet 136. A vacuum is drawn on the outlet 136. The plastic sheet 124, as raised to thermoforming temperature by heater 128, is placed over the cavity 138. By vacuum, the heated sheet 124 takes on the shape of the cavity 138 to produce a part 140 which is the shape of the ceiling tile insert of FIG. 11. To provide self-support for the dished portion of the ceiling tile insert, cross-strengthening ribs 142 are formed in the part by way of appropriate grooves formed in the vacuum forming cavity 138. The acoustical pattern of apertures is formed in the exterior face 144 of the formed part 140 by a punch 146. The part 140 with the acoustical apertures therein is then inverted and the moisture barrier 148 is applied to the inverted part 140 and subsequently packaged at station 158. As shown in more detail in FIG. 13, an adhesive may be applied to the interior of part 140. The barrier material 148 is supported by clamps 152. Before the adhesive is set, the moisture barrier 148 is lowered in the direction of arrow 154 onto the part 140 to form a seal about the perimeter. A vacuum is drawn through the apertures 156 formed in the face 144 of the part to draw the film and adhere it against the interior surface of the part bottom 144, thereby forming the completed ceiling tile insert 66 of FIG. 11.

The ceiling tile insert, in order to be self-supporting without strengthening ribs, can be manufactured, for example, from polystyrene to a thickness of approximately 1/16 inch. It is appreciated that thinner inserts of the same or different material may be used having thicknesses ranging from 0.010 inches up to 0.60 inches. In working with these thicknesses of tiles, not only can ornamentation be added to the face of the tile by strengthening ribs and decorative acoustical patterns for the apertures, but also coloring may be incorporated in the plastic tile to provide a variety of colors in refurbishing the suspended tile ceiling. The coloring of the tile inserts can be coordinated with the wall and floor colorings.

Due to the use of a ceiling tile insert having a surface which may be printed, such as the surface of plastic material, decorative effects on the face of a plastic insert can be created. For example, various patterns may be lithographed onto the outer face of the ceiling tile insert to enhance the overall appearance of the room in which the inserts are placed. Should the walls include a type of wallpaper with a textured finish such as "grass cloth", the ceiling tile insert may be lithographed to provide a surface with a straw colored tint and having printed thereon a design which complements the appearance of the grass cloth. Furthermore, the moisture barrier as positioned on the rear face of the tile insert can be of various colors to blend in with the surface color of the ceiling tile insert.

The tile insert can be formed of materials having acceptable fire ratings on flame spread and smoke generation. A treated polyvinylchloride material with fire retardants may be used which has a rating of twenty-five for flame spread and fifty for smoke development in accordance with the National Building Code, which is a class 1 AMA flame spread index.

Should the tile insert be formed of plastic, its face portion is inherently washable. However with other surfaces, such as aluminum or pressboard, the face may be provided with a laminated layer which is washable or a paint layer which provides for washability. The surface of the plastic tile insert may be treated with antistatic compounds to resist the accumulation of dust on the faces of the tile inserts. The face of the tile insert is readily cleaned by use of a damp cloth or a fine spray of cleaning solution which can be wiped with a sponge. By use of the moisture barrier, there is little if any likelihood of moisture in the holes bleeding dirt down onto the face of the tile which would require subsequent washing. The tile inserts are sufficiently thin that washing will normally clean out dirt from the acoustical holes. The tiles are particularly useful in areas requiring sanitary conditions, such as cooking areas, hospitals and environment controlled rooms. The ceiling tile inserts are long lasting and may be cleaned any number of times by mild chemicals to maintain the fresh look of the refurbished suspended ceiling. The tile, due to the acoustical pattern of holes, retains the acoustical values of the existing ceiling without requiring replacement of the existing tiles. The tiles, when made particularly of the planar type as shown in FIG. 2, can be readily cut to the size of ceiling tile in the suspended grid network which is to be refurbished. The moisture barrier as optionally affixed to the rear of the ceiling insert readily provides for custom cutting of the tile pieces and insertion where required in the suspended ceiling.

EXAMPLE 1

The noise reduction coefficient (NRC) which is a measure of the sound absorptive characteristics, was determined for composite ceiling tile insert and acoustical panel of this invention compared to a normal acoustical panel. The samples tested were an acoustical panel normally used in suspended ceilings, the ceiling tile insert of this invention in direct contact with the acoustical panel, and the ceiling tile insert of this invention at a distance of approximately $\frac{1}{4}$ inch from the acoustical panel. The noise reduction co-efficient is the arithmetic mean of the four absorption co-efficients calculated for frequencies of 250, 500, 1,000 and 2,000 Hz. The value so obtained is rounded off to the nearest multiple of 0.05. The absorption co-efficient represents the ratio of sound absorbing effectiveness, at a specific frequency, of a unit area of acoustical absorbent to a unit area of perfectly absorptive material. The tests were conducted in accordance with ASTM C-423-81A Standard using the type E-400 mounting.

The acoustic absorption co-efficient for each of the $\frac{1}{3}$ of octave frequency band was calculated by the following equations:

$$X = (A_s - A_e)/S \qquad (1)$$

where
x = Absorption co-efficient
$A_s$ = Absorption of room with sample in (metric sabin)
$A_e$ = Absorption of empty room
S = Total sample area (ft$^2$)
The absorption is given by:

$$A = 0.9210 c^{vd} \qquad (2)$$

where
v = Volume of the reverberation room (ft$^3$)
d = Rate of decay (db/s)
c = Speed of sound in air (1130 ft/s) Since recorded time is for a 60 db drop one can write d = n/t = 60/t $$x = \frac{v*60 + 0.9210}{s*1130} \left( \frac{1}{ts} - \frac{1}{te} \right) \qquad (3)$$

$$x = 0.049 \frac{v}{s} \left( \frac{1}{ts} - \frac{1}{te} \right)$$

The results of the tests are as follows:

| Sample Tested | NRC (Noise reduction co-efficient) |
|---|---|
| Acoustic panels | 0.50 (0.5230) |
| Plastic inserts in contact with acoustic panels | 0.50 (0.4964) |
| Plastic inserts at a distance of $\frac{1}{4}$" from acoustic panels | 0.60 (0.6095) |

Figure 16:
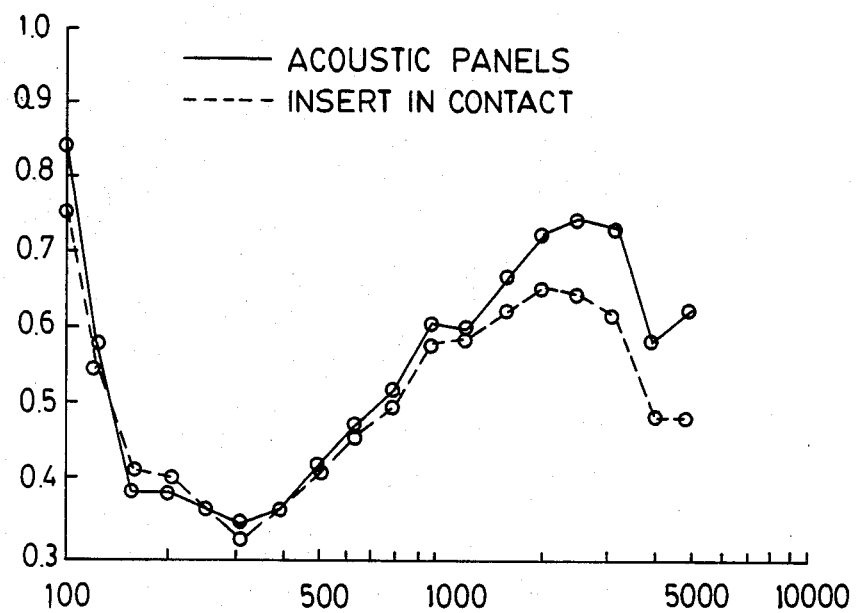
FIGS. 16 and 17 are graphs plotting Absorption Coefficients versus frequency for ceiling tile inserts of this invention.
Figure 17:
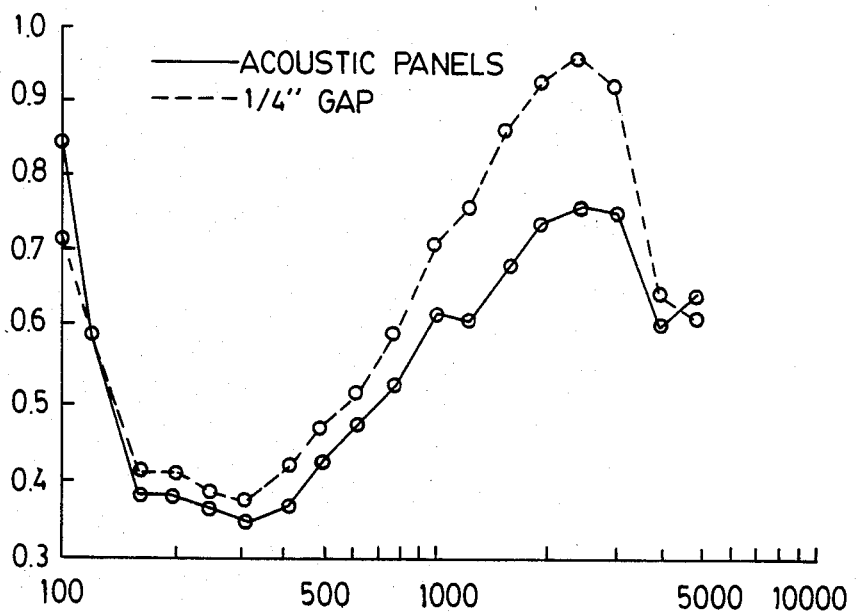

A plot of the acoustic absorption co-efficient for each $\frac{1}{3}$ of octave frequency band was calculated in accordance with the above formulae. The values of the absorption co-efficient versus the frequencies for the acoustic panel alone, the plastic insert in contact with the acoustic panel and a $\frac{1}{4}$" gap between the acoustic panel and the insert are shown in FIGS. 16 and 17. FIG. 16 illustrates that with the insert in contact with the acoustic panel, the absorption co-efficient is less than with the uncovered acoustic panel, whereas $\frac{1}{4}$" gap between the plastic insert and the acoustic panel provides absorption co-efficients which are considerably higher for the system with the insert spaced from the acoustic panel.

From these results it is apparent that a gap between the ceiling tile inserts and the acoustic panels provide very high absorption co-efficients relative to the standard type of acoustic panel. Such gap may be provided in a variety of ways such as illustrated in FIGS. 9 and 12. Furthermore, with respect to the particular absorption co-efficients versus frequency as shown in FIG. 17, the system with the gap between the ceiling tile insert and the acoustic panel provides significant improvements particularly in the higher frequencies in the range of 2.5 kHz. This system provides greatly improved sound absorption characteristics in the range most needed, particularly in office environments where word processing equipment, telephone, and other machines generate sounds in this range which are considerably dampened by this system.

The ceiling tile inserts according to this invention with moisture barrier not only provide a system for enhancing or refurbishing an existing suspended ceiling tile system, but also, when used in accordance with a preferred embodiment of this invention and spaced to a slight degree from the acoustic panels, provide significant improvements in sound absorption characteristics in the ceiling.

Although preferred embodiments of the invention have been described herein in detail, it will be understood by those skilled in the art that variations may be made thereto without departing from the spirit of the invention or the scope of the appended claims.

I claim:

1. A method for refurbishing a suspended acoustical tile ceiling when the acoustical tiles become soiled, the suspended tile ceiling includes a plurality of soiled suspended tile supporting members arranged in a grid formation, said supporting members supporting a tile by engaging a perimeter portion of each tile, said method comprising inserting a tile insert beneath each soiled tile, said insert being of a size to correspond with the size of the soiled tile whereby said supporting members support said tile insert beneath and thereby covering said soiled tile, said tile insert comprising a thin layer of substantially rigid material with a plurality of holes extending therethrough in the form of an acoustical pattern of holes, said tile insert having a front face which is of washable material, a moisture barrier layer being affixed to a rear face of said tile insert whereby said barrier layer cover said holes and isolates said insert tile rear face from said soiled acoustical tile.

2. A method of claim 1, wherein said tile insert is affixed to said soiled acoustical tile at spaced intervals.

3. A method of claim 2 wherein a gap is provided between said tile insert and said soiled acoustical tile at least between areas where said tile insert is affixed to said soiled acoustical tile.

4. A method of claim 3 wherein said moisture barrier is affixed to said rear face of said tile insert at spaced intervals to provide for a loose fitting of said moisture barrier over said rear face between areas where said moisture barrier is affixed to said rear face.

5. A method of claim 4 wherein said moisture barrier is affixed to said rear face of said tile insert in at least areas where said tile insert is affixed to said soiled tile.

6. A method of claim 2 wherein fasteners are used to affix said sagging tile insert to said soiled acoustical tile.

7. A method of claim 2 wherein an adhesive is used to affix said tile insert to said soiled acoustical tile.

8. A method of claim 1, wherein said tile insert tends to sag, inserting one or more supporting strips beneath said tile insert and spanning said supporting members approximately midway of an insert tile's length.

9. A method of claim 1, wherein said thin layer of substantially rigid material is self-supporting across the span of said grid of supporting members to provide a gap of approximately ¼" between said tile insert and said soiled tile.

10. A method of claim 1, wherein said thin layer of substantially rigid sheet material is formed with strengthening ribs therein to preclude appreciable sag of said tile insert when installed beneath a soiled tile.

11. A method of claim 1, wherein said substantially rigid material is made of a material selected from the group consisting of plastics, aluminum alloy and pressboard.

12. A method of claim 1, wherein said vapor barrier is made of a material selected from the group consisting of plastic film, thin rubber, rubber foam, plastic foam, waterproof flame retardant paper and aluminum foil.

13. A composite suspended tile ceiling comprising a plurality of suspended tile supporting members arranged in a grid formation, a tile insert comprising a thin layer of substantially rigid material with a plurality of holes extending therethrough in the form of an acoustical pattern of holes, said tile insert having a front face which is of washable material, said tile insert being supported about its perimeter edges by said grid of supporting members, an acoustical panel lying above and unattached to said tile insert a moisture barrier layer being affixed to a rear face of said tile insert, said moisture barrier isolating said insert tile rear face from said acoustical panel.

14. A composite suspended tile ceiling of claim 13, wherein means is provided for affixing said tile insert to said acoustical panel at spaced locations to provide for gaps between said tile insert and said acoustical panel.

15. A composite suspended tile ceiling of claim 14 wherein means affixes said moisture barrier to said rear face of said tile insert at spaced apart locations to provide unstretched loose fitting moisture barrier between said locations, said moisture barrier dampening audible sound waves passing through said acoustical pattern of holes.

16. A composite suspended tile ceiling of claim 14 or 15 wherein said affixing means is an adhesive or fasteners.

17. A composite suspended tile ceiling of claim 13, wherein said tile insert tends to sag, one or more supporting strips beneath said tile insert and spanning said supporting members approximately intermediate of an insert tile's length.

18. A composite suspended tile ceiling of claim 14, wherein said affixing means is a fastener which extends through an aperture of said tile and through said acoustical panel and draws said tile insert towards said acoustical panel by engaging an interior surface of said acoustical panel.

19. A composite suspended tile ceiling of claim 13, wherein said thin layer of substantially rigid material is self-supporting across the span of said grid of supporting members to preclude appreciable sag of said tile insert when installed beneath said acoustical panel.

20. A composite suspended tile ceiling of claim 13, wherein said thin layer of substantially rigid sheet material includes strengthening ribs to preclude appreciable sag of said tile insert when installed beneath said acoustical panels, said substantially rigid sheet material being provided with a recessed portion within its perimeter to space said recessed portion with moisture barrier from said acoustical panel.

21. A composite suspended tile ceiling of claim 13, wherein peripheral portions of said rear face of the tile insert are defined about said holes extending through said tile insert, said moisture barrier being affixed to a majority of said peripheral portions about said holes of said rear face to seal thereby a majority of said holes from one another.

22. A composite suspended tile ceiling of claim 21, wherein said moisture barrier is affixed to essentially all of said peripheral portions about said holes.

23. A composite suspended tile ceiling of claim 13, wherein said thin layer of substantially rigid sheet material is formed of a material having fire retardant components to minimize flame spread across said insert tile in the event of a fire beneath said suspehded tile ceiling.

24. A composite suspended tile ceiling of claim 23, wherein said thin layer material is selected from the group consisting of rigid plastics, painted aluminum alloys and pressboard.

25. A composite suspended tile ceiling of claim 24, wherein said rigid plastics are selected from the group consisting of acrylonitrile-butadiene-styrene polymers, acrylic polymers, phenolic polymers, Nylon (trademark), polycarbonate polymers, polyesters, high and low density polyethylene and copolymers thereof, polyimides, polypropylene, polystyrene and polyvinyl chloride.

26. A composite suspended tile ceiling of claim 23, wherein said moisture barrier is of a material selected from the group consisting of plastic film, thin rubber, rubber foam, plastic foam, waterproof flame retardant paper, and aluminum foil.

27. A composite suspended tile ceiling of claim 25, wherein a selected plastic includes an anti-static compound.

28. A tile insert for use in refurbishing soiled acoustical tiles of a suspended tile ceiling comprises a thin layer of substantially rigid material with a plurality of holes extending therethrough in the form of an acoustical pattern of holes, said tile insert having a front face which is of washable material and a moisture barrier layer affixed to a rear face of said tile insert, said tile insert being sized to fit beneath a soiled tile of a suspended tile ceiling and be supported by supporting members of a suspended tile ceiling.

29. A tile insert of claim 28, wherein said thin layer of substantially rigid material includes strengthening ribs therein to preclude appreciable sag of said tile insert when installed beneath a soiled tile of a suspended tile ceiling.

30. A tile insert of claim 28, wherein peripheral portions of said rear face of said tile insert are defined about said holes extending through said tile insert, said moisture barrier being affixed to a majority of said peripheral portions about said holes of said rear face to seal thereby a majority of said holes from one another.

31. A tile insert of claim 30, wherein said moisture barrier is affixed to essentially all of said peripheral portions about said holes.

32. A tile insert of claim 28, wherein said thin layer of substantially rigid sheet material is formed of a material having fire retardant components to minimize flame spread across said insert tile in the event of a fire beneath said suspended tile ceiling.

33. A tile insert of claim 32, wherein said thin layer material is selected from the group consisting of plastics, which when formed into a thin layer are substantially rigid, painted aluminum alloys and pressboard.

34. A tile insert of claim 33, wherein said plastics are selected from the group consisting of acrylonitrile-butadiene-styrene polymers, acrylic polymers, phenolic polymers, Nylon (trademark), polycarbonate polymers, polyesters, high and low density polyethylene and copolymers thereof, polyimides, polypropylene, polystyrene and polyvinyl chloride.

35. A tile insert of claim 32, wherein said moisture barrier is of a material selected from the group consisting of plastic film, thin rubber, rubber foam, plastic foam, waterproof flame retardant paper, and aluminum foil.

36. A tile insert of claim 34, wherein a selected plastic includes an anti-static compound.

37. A method of claim 36, further comprising thermoforming a plurality of strengthening ribs in forming said thin layer of substantially rigid plastic material.

38. A tile insert of claim 28, wherein said moisture barrier layer is a thin film of polyethylene loosely fitted in an unstretched manner to said rear face of said tile insert, said film having a thickness in the range of one-half to 10 mil, said polyethylene film appreciately dampening audible sound waves passing through said acoustical pattern of holes.

39. A method for manufacturing a tile insert for use in refurbishing a suspended tile ceiling comprises forming a thin layer of substantially rigid material, forming a plurality of holes through said tile insert which are positioned to form an acoustical pattern in the tile insert, providing a front face of said tile insert which is washable, affixing to a rear face of said tile insert a moisture barrier film for covering at least said acoustical pattern of holes.

40. A method of claim 39, wherein peripheral portions of said rear face of the tile insert are defined about said holes extending through said tile insert, applying an adhesive to a majority of a rear face of said moisture barrier film, affixing said moisture barrier film by said adhesive to the rear face of said tile insert to seal thereby a majority of holes from one another.

41. A method of claim 40, wherein said thin layer of substantially rigid material is formed of a plastic, said moisture barrier film being formed of a plastic which is heat sealable to said plastic of said thin layer material, heat sealing said moisture barrier film to said rear face of said tile insert to cover said acoustical pattern holes to seal essentially all of said holes from one another.

42. A method of claim 39, further comprising extruding said thin layer of substantially rigid material from an extrudable plastic material, allowing the extruded layer to cool, punching said acoustical pattern of holes in the extruded layer, affixing said moisture barrier film to the rear face of the punched extruded layer and cutting the punched extruded layer with said moisture barrier affixed thereto to form said tile insert.

43. A method of claim 42, further comprising extruding strengthening ribs in the extruded layer.

44. A method of claim 39, wherein said acoustical pattern of holes are formed in sets of rows along said tile insert, affixing with adhesive said moisture barrier film to said tile insert rear face between said sets of rows of acoustical pattern of holes, said moisture barrier film being unstretched in spanning said rows of acoustical pattern of holes.

45. A method of claim 44, wherein said moisture barrier film is a plastic film.

* * * * *